United States Patent

Graham et al.

[15] 3,638,907
[45] Feb. 1, 1972

[54] QUICK COUPLING APPARATUS
[72] Inventors: Harold R. Graham, Houston; Gerald A. Graham, Smith County, both of Tex.
[73] Assignee: said Raymond L. Graham, by said Gerald A. Graham
[22] Filed: Oct. 10, 1969
[21] Appl. No.: 865,393

[52] U.S. Cl. .................................................251/148
[51] Int. Cl. .................................................F16l 29/00
[58] Field of Search ...............251/148, 152, 151; 137/515.5, 137/527.6; 285/320, 311

[56] References Cited

UNITED STATES PATENTS

| | | |
|---|---|---|
| 757,752 | 4/1904 | Killen .................................285/311 |
| 1,331,715 | 2/1920 | Lindfors .............................285/311 |
| 1,932,348 | 10/1933 | Long ...................................137/515.5 |
| 2,482,198 | 9/1949 | Melichar ............................251/152 X |
| 3,009,475 | 11/1961 | Richterkessing et al. .......137/515.5 X |

Primary Examiner—M. Cary Nelson
Assistant Examiner—R. B. Rothman
Attorney—Pravel, Wilson & Matthews

[57] ABSTRACT

An assembly, including a male member for receiving a coupling latch mechanism mounted with a female member and a valve means mounted with the male member responsive to pressure to thereby open the valve means to enable fluids or gases to flow therethrough.

3 Claims, 5 Drawing Figures

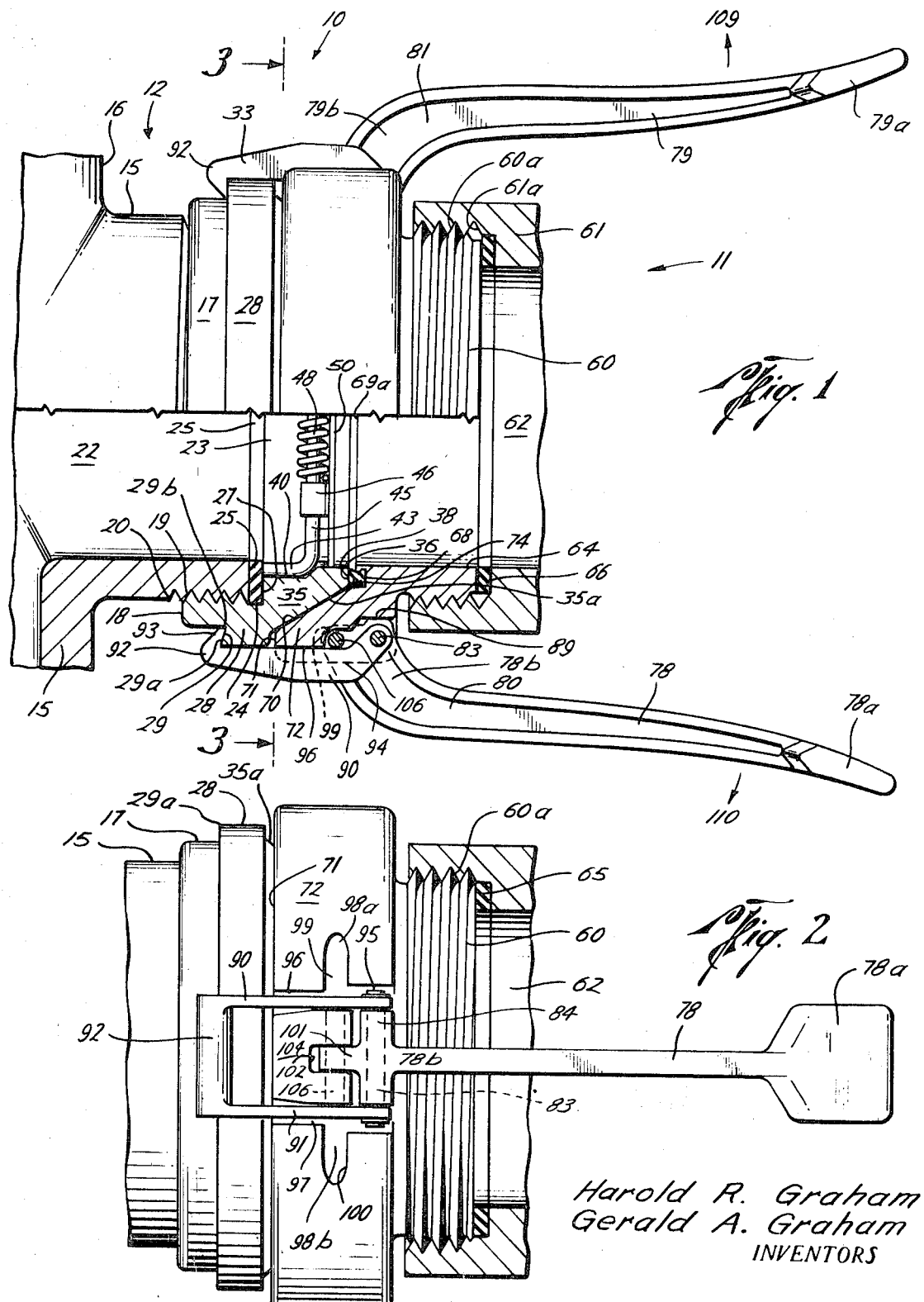

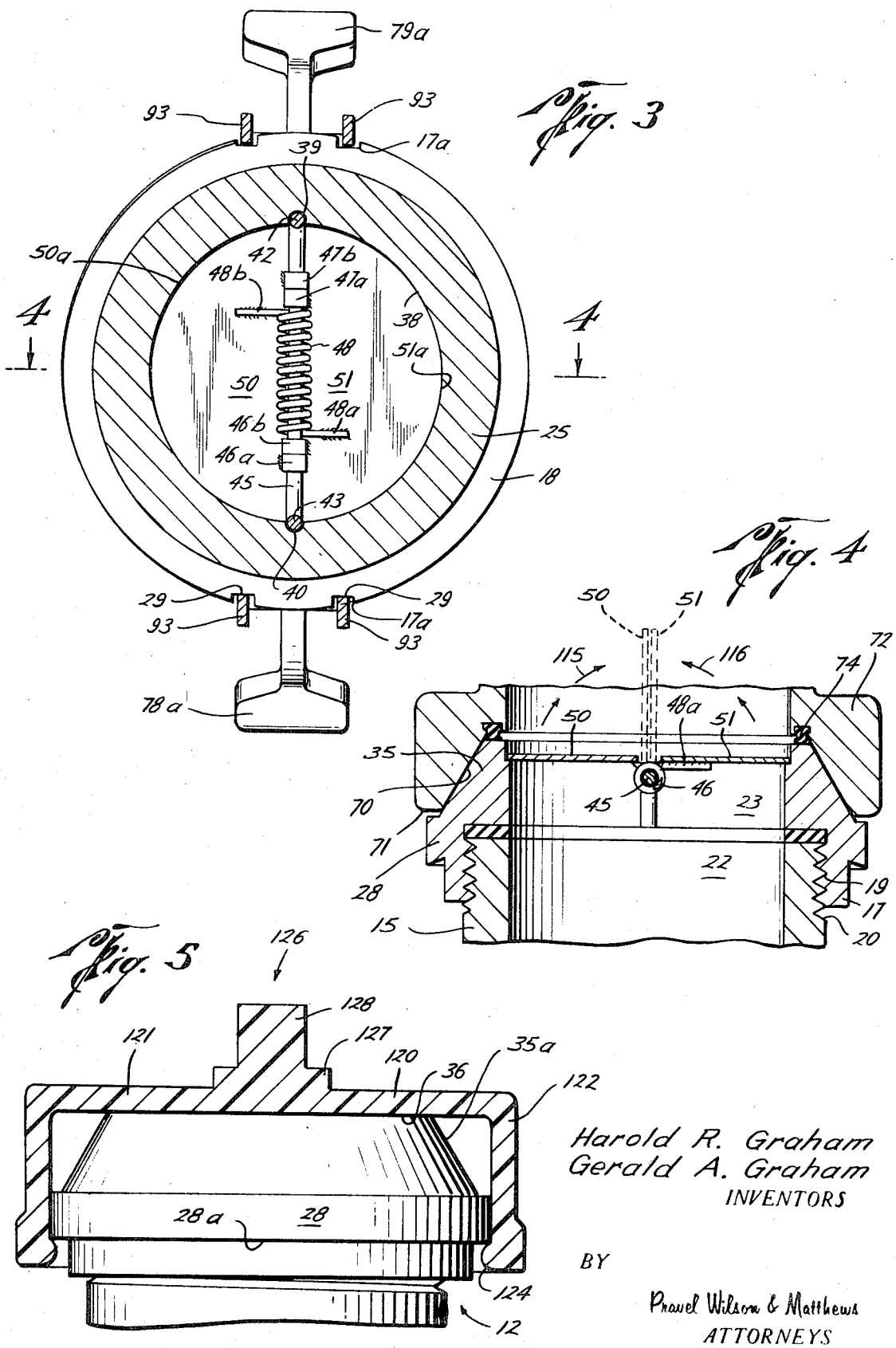

QUICK COUPLING APPARATUS

BACKGROUND OF THE INVENTION

1. Field of the Invention

This invention relates to a new and improved quick-coupling apparatus for use with fire hydrants and/or other apparatus which require fast, efficient and accurate coupling of mechanisms relative to each other to enable fluids or gasses to flow through such coupling apparatus.

2. Description of the Prior Art

In the prior art, it is well known that the way to connect, for example, a fire hose from a fire truck or the like to a fire hydrant requires either the unfastening of a cap from the mouth of the fire hydrant and fastening the end of the fire hose, or if a cap or cover is not positioned in the fire hose, merely fastening the end of the fire hose to the fire hydrant or plug. Thereafter, the hose must be tightly secured to the fire hydrant because of the high water pressure flowing through the connection between the fire hydrant and the fire hose.

Such connections by a fireman of the fire hose and fire hydrant must be done fast and efficiently because the amount of water which can be directed on a fire in the first 2 to 5 minutes after fire fighting equipment reaches the scene of the fire is a major factor with respect to how quickly the fire can be brought under control which thus limits the damage of the fire even before the fire is extinguished. However, with the old method of connecting a fire hose to a fire hydrant, the first 2 or more minutes after such equipment arrived at the scene of the fire were sometimes spent in attempting to connect the hose with the hydrant which resulted in several thousand dollars in damages which could have been eliminated.

SUMMARY OF THE INVENTION

Briefly, the present invention relates to a new and improved quick-coupling apparatus for fire hydrants and other mechanisms including a male member secured with the fire hydrant and a female coupling member adapted to be quickly and fixedly secured to such connecting member and means mounted with such connecting member for enabling water to flow from the fire hydrant through a fire hose connected with the female quick coupling member and for preventing foreign articles and the like from entering the fire hydrant when the quick-coupling apparatus is not in use.

It is an object of the present invention to provide a new and improved quick-coupling apparatus for enabling members or mechanisms or machines connected with such apparatus to be quickly and easily attached and detached.

Another object of the present invention is to provide a new and improved quick-coupling apparatus including male and female sections and a quickly detachable throwaway cover means for said male section to prevent accumulation of dust, dirt or other unwanted particles in the male member until such member is coupled to such female member.

BRIEF DESCRIPTION OF THE DRAWINGS

FIG. 1 is a partial sectional view of the quick-coupling male and female member;

FIG. 2 is a partial sectional side view illustrating the relationship of the male coupling meter with a pivotal arm for the female member;

FIG. 3 is a partly sectional front view of a spring-loaded valve means secured with the male coupling member;

FIG. 4 is a partly sectional view taken along line 4—4 of FIG. 3, illustrating relative movement of such spring-loaded valve; and FIG. 5 illustrates a detachable cover member mounted with the male quick-coupling member.

DESCRIPTION OF THE PREFERRED EMBODIMENT

Attention is directed to FIG. 1 wherein the quick coupling apparatus of the present invention is generally designated by the numeral 10 and is illustrated as including a female coupling member generally designated at 11 and a male coupling member generally designated at 12.

The male coupling member 12 is secured with the outlet end or neck 15 of a fire hydrant 16 which is partially shown. A collar member 17 of such male coupling member 12, includes an end 18 and an inner threaded portion 19 which is threadedly engaged with the threads 20 on the outer surface of the neck 15 for enabling an opening 22 of the neck 15 to communicate with an opening 23 in the male member 12. Collar member 17 of the member 12 is integrally machined with a seal receiving slot 24 for receiving sealing member 25 which extends circumferentially around the periphery of the opening 23 as illustrated in FIG. 3. Sealing member 25 is positioned and abuts a ledge or rim 27 and abuts the threads 19. As illustrated in FIG. 1, an outwardly extending latch-receiving portion 28 is integrally mounted with the collar portion 17 and is defined by an outer latch-retaining surface 29 which is slanted from its outer surface 29a inwardly to corner surface 29b for receiving latch ears or grips 33.

A receiving neck member or male member 35 is integrally mounted with the member 28. The outer surface 35a of such member is slanted from adjacent member 28 to the end 36 of such member 35 inwardly toward the opening 23 of such male member 12. The inner surface of such member 35 is defined by an inner circumferential wall 38 immediately adjacent the opening 23.

A pair of slotted machined grooves 39 and 40 (FIG. 3) are formed at diagonally opposite positions in the inner surface wall 38, immediately adjacent the corner surface or end 27 and the seal member 25. Each of the grooves 39 and 40 is of sufficient width and depth to receive a pair of transverse arms 42 and 43, respectively. A spring shaft member 45 is integrally connected to each of the arms 42 and 43 and extends across the opening 23 of the male member 12. A set of pivotal hinge members 46a, 46b and 47a, 47b, are mounted and received by the shaft 45. A pair of semicircular valve closing members 50 and 51 are positioned relative to each other and to such spring shaft 45 such that the semicircular surface 50a of member 50 and the semicircular surface 51a of member 51 form a complete circle, as illustrated in FIG. 3, to enable the surfaces 50a and 51a to fit snugly abut the circumferential surface 38. Each of the members 50 and 51 is retained adjacent the shaft 45 by welding or attaching such members 50 and 51 to the retainer members 46a, 47b and 46b, 47a, respectively. Each of the outwardly extending ends 48a and 48b of the spring member 48 are also welded or secured with the members 51 and 50, respectively, as illustrated in FIG. 3 so that such members 50 and 51 prevent communication of the male member 12 with the female member 11 until water pressure rushing through the openings 22 and 23 is sufficient to overcome the force of the spring or coil means 48 as will be set forth hereinafter.

The female or stabbing member generally designated at 11 includes a threaded collar portion 60 having external threads 60a for threaded engagement with internal threads 61a of a suitable fire hose 61. Fire hose 61 includes an opening 62 communicating with an opening 63 formed in the stabbing member 11 by the interior circumferential wall 64. As illustrated in FIGS. 1 and 2, a sealing member 65 is mounted in a seat 66 machined in the collar portion 60 of the fire hose 61 to prevent the leaking of fluid between the collar portion 60 of the stabbing flank or stabbing member 11 and the collar portion 60 of the fire hose 61.

A sealing groove 68 is formed in the end 69 of the interior portion of the stabbing member 11 adjacent the end 36 of the male member 12. The groove 68 as illustrated in FIG. 1 is formed between the corner 69a of the end 69 and a slanted surface 70 of the stabbing member 11 formed interiorly thereof between the grooves 68 and the end abutment 71 of a stabbing portion 72 of the stabbing member 11. Groove 68 receives a fitted seal 74 which abuts and contacts the end portion 36 of the female member 12, as illustrated in FIGS. 1 and 4. A pair of quick-coupling latch handles 78 and 79 include ends 78a and 79a, respectively, for enabling users to grip such ends to couple and uncouple the stabbing member 11 from the male member 12. Each of the handles 78 and 79 are curved inwardly at 80 and 81, respectively, such that each of the ends 78b and 79b are pivotally mounted as will be set forth hereinafter. For purposes of description, the relationship of each of the handles 78 and 79 relative to the stabbing member 11 will be set forth hereinafter with only the handle 78 being discussed in detail as such detail is illustrated in FIGS. 1 and 2.

As illustrated in FIGS. 1 and 2, a pivot pin 83 extends through a transverse arm 84 integrally machined with the end 78b of the handle 78 adjacent the outer milled cutaway surface 89 formed in the exterior of the stabbing member 11. The latching grips 33 includes a pair of yoke arms 90 and 91 and a crossarm 92. The crossarm 92 includes a pointed neck portion 93, which, in a position illustrated in FIG. 1, abuts and contacts the surface 29 of the member 28. It should also be noted that each of the arm members 90 and 91 abut the outer surface of the member 28 and a pair of milled grooves 96 and 97, respectively, of the member 72. The opposite end of each of the arms 90 and 91 is curved inwardly at 94 to receive the pin 83 therethrough, with the pin 83 being retained by suitable nut means 95.

A longitudinal groove 98 extends across each of the grooves 96 and 97 and is defined by a lower grooved surface 99 in the portion 72. An extension tab 101 of the latch handle 78 extends outwardly into milled grove 102 which is intermediate sections 98a and 98b of groove 98 with each of such sections 98a and 98b being immediately adjacent arms 90 and 91, respectively, as illustrated in FIG. 2. Groove 102 is milled in Y-shaped member 104 of member 72 positioned between the arms 90 and 91. A pin or pivotal member 106 is received by the Y-shaped member 104 and the extension tab 101 for securing the arm handles 78 to the stabbing member 72. It should be noted that the Y-shaped member 104 forms the inner sidewall for each of the grooves 96 and 97, and that each of the grooves 98a and 98b extend under the arms 90 and 91 to the Y-shaped member 104 to enable the pin 106 to be positioned in such Y-shaped member 104 and the extension tab 101.

In the operation of the invention, the male member 12 is threadedly engaged at its collar portion 17 with the exterior threads 20 on the neck 15 of a fire hydrant 16. In this position, the coil spring 48 maintains each of the section members 50 and 51 in the position illustrated as in FIG. 3 such that the opening 23 in the female member 11 cannot communicate with the female member 11 on the opposite side from the spring 48 of the pivotal members 50 and 51.

When it is desired to use the fire hydrant, by connecting the fire hydrant to a suitable fire hose, with the stabbing member 11 attached to such hose, the user grips each of the handles 78 and 79 and moves the handles away from each other in the direction of the arrows 109 and 110. Such movement outwardly rotates the ends 78b and 79b of each of the handles 78 and 79 about the pins 83 and at the same time rotates the pins 83 and arm 84 outwardly about the pin 106. Additionally, the extension tab 101 pivots outwardly about the pin 106, and because such pin 106 is mounted with Y-shaped member 104 of stabbing portion 72, the arms 90 and 91 of the latch grips 33 move upwardly. The curved portion 94 of each of the arms 90 and 91 insures that as each of the arms move upwardly, the necks 93 of the grips 33 also move inwardly so that as an individual who is gripping the stabbing member 11 pivots the arms in the direction of the arrows 109 and 110, each of the latch members 33 move upwardly and inwardly. At the same time, the surfaces 70 and 35a are slanted to complementarily fit and abut each other until the end 36 of the female member 12 abuts the seal member 74 positioned in groove 68.

In this position, the crossarm 92 of each of the latch members 33 is positioned such that the inwardly pointed necks 93 is aligned with the upper portion of the grooves 17a (FIG. 3) formed in the collar portion 17 and the neck 93 abuts the surface 29. The handles 78 and 79 are then rotated in a direction opposite from the arrows 110 and 109, respectively, which moves each of the arms 90 and 91 downwardly as such arms rotate about the pins 83 and 106. However, with the arms 78 and 79 being rotated in the opposite direction from the arrows 109 and 110, the pins 83, arms 90 and 91 adjacent the curved section 94 of each of the arms, and the ends 78b and 79b adjacent the pins 83, must be moved inwardly toward the outer milled grooved surface 89 which communicates with grooved surfaces 96, 97 and 98 of the stabbing section 72. Thus the arms 78 and 79 rotate about the fixed pin 106 which moves the movable pin 83, movable arm 84, inwardly into the milled surface 89 in the member 72. This action firmly clamps the female member 11 to the male member 12.

When the female member 11 is firmly secured with the male member 12, the water from the fire hydrant 16 is then turned on and moves through the openings 23 and 63 of the female and male members, respectively, and into the opening 62 of the fire hose 61. When the water pressure contacts the pivotal members 50 and 51, such pressure is sufficient to overcome the coil spring 48 to rotate each of the members 50 and 51 in the direction of the arrows 115 and 116 such that the pivotal members 50 and 51 are positioned, as illustrated by the dotted lines in FIG. 4, immediately adjacent each other to remove any obstruction in the opening 23 to enable the openings 22, 23, 63 and 62 to communicate with each other. Of course, after the water is cut off or reduced, the force of the coil spring 48 is sufficient to move the members 50 and 51 back to their original positions as illustrated in FIG. 3.

As illustrated in FIG. 5, a suitable cover 120 out of such material as plastic, polyethylene, or other suitable material is provided for covering the opening 23 of the male member 12 when such member is not in use. Such cover 120 includes an end plate 121 of sufficient width to extend across the width of the opening 23 (not numbered in FIG. 5) and a circumferential cover section 122 for receiving the slanted surface 35a and the tab member 28 therein, as illustrated in FIG. 5. A protruding circumferential lip member 124 extends past the corner 28a of the tab member 28 to enable the lip to be caught or retained by the corner 28a for retention of the cover 120 thereon.

A nose or kick member generally designated at 126 includes a base 127 mounted with the cover plate 121 and a tab portion 128 extending outwardly therefrom.

The cover member 120 is for preventing dust and other particles from gathering on the pivotal sections 50 and 51 and also to prevent freezing of the pivotal members 50 and 51 to the wall 38 or to other portions of the quick-coupling apparatus. When it is desired to remove the cover members 120, if the fireman also has the female member 11 in his hands, he merely has to kick the tab 128 a glancing blow and due to the flexibility of the cover member 120, the protruding circumferential lip 124 slips over corner 28a.

The foregoing disclosure and description of the invention are illustrative and explanatory thereof, and various changes in the size, shape, and materials as well as in the details of the illustrated construction may be made without departing from the spirit of the invention.

We claim:
1. A quick-coupling apparatus comprising:
   a. a male section including:
      1. an interior circumferential wall defining an opening;
      2. an exterior wall including a tapered circumferential outwardly extending section and an edge retaining section integrally mounted therewith;
      3. said male section having receiving grooves formed in said interior circumferential wall;
   b. a female section including:
      1. an interior wall defining an opening for enabling communicating with said opening in said male section;
      2. quick release means for securing said female section to said male section said quick release means gripping said edge retaining section for connecting said male and female sections;

c. means mounted with said male section and extending across said opening in said male section for preventing said opening in said male section from communicating with said opening in said female section until actuation of said means mounted with said male section; and d. spring shaft means for mounting said means for preventing in said male section, said spring shaft means having transverse arms integral therewith, said transverse arms being mounted in said grooves in said male section.

2. The structure as set forth in claim 1 wherein said female section includes:

a. an exterior wall including an inwardly extending tapered stabbing section;

b. said quick release means includes:

1. handle means pivotally mounted with said female section;

2. latch means pivotally mounted with said handle means wherein said stabbing section of said female section is stabbed onto said tapered surface of said male section and said handle means is pivoted outwardly to pivotally move said latch means upwardly and wherein pivotal inward movement of said handle means moves said latch means downwardly to contact and firmly grip said edge retaining section to thereby connect said male and female sections.

3. The structure as set forth in claim 2 including sealing means mounted on the end of said tapered section of said male section for sealing between said male and female sections to prevent leakage of fluids from said quick-coupling apparatus when the male and female are connected.

* * * * *